(12) United States Patent
Zhu et al.

(10) Patent No.: US 12,065,207 B1
(45) Date of Patent: Aug. 20, 2024

(54) HIGH-MOBILITY WHEELED CLIMBING ROBOT

(71) Applicant: GUANGDONG UNIVERSITY OF TECHNOLOGY, Guangdong (CN)

(72) Inventors: Haifei Zhu, Guangdong (CN); Yongjian Bu, Guangdong (CN); Yongzhong Bu, Guangdong (CN)

(73) Assignee: GUANGDONG UNIVERSITY OF TECHNOLOGY, Guangdong (CN)

( * ) Notice: Subject to any disclaimer, the term of this patent is extended or adjusted under 35 U.S.C. 154(b) by 0 days.

(21) Appl. No.: 18/605,784

(22) Filed: Mar. 14, 2024

(30) Foreign Application Priority Data

Dec. 22, 2023 (CN) .......................... 202311780530.8

(51) Int. Cl.
*B62D 63/04* (2006.01)
(52) U.S. Cl.
CPC ..................... *B62D 63/04* (2013.01)
(58) Field of Classification Search
CPC ......... B62D 63/04; B62D 61/12; B62D 61/00
See application file for complete search history.

(56) References Cited

U.S. PATENT DOCUMENTS

| | | | |
|---|---|---|---|
| 6,548,982 B1 * | 4/2003 | Papanikolopoulos | B62D 57/02 446/457 |
| 7,559,385 B1 * | 7/2009 | Burt | B60K 7/0007 901/1 |
| 8,186,469 B2 * | 5/2012 | Yim | B25J 5/007 180/218 |
| 8,496,077 B2 * | 7/2013 | Nesnas | B62D 21/04 180/21 |
| 9,487,254 B2 * | 11/2016 | Rochat | B62D 57/024 |
| 10,526,029 B2 * | 1/2020 | Kossett | F41H 7/005 |

(Continued)

FOREIGN PATENT DOCUMENTS

| | | |
|---|---|---|
| CN | 210191676 | 3/2020 |
| CN | 111252159 | 6/2020 |

(Continued)

OTHER PUBLICATIONS

Junhua Lu et al., "Global path planning for a biped wall-climbing robot in 3D wall environment", Journal of Harbin Institute of Technology, vol. 52, Jan. 2020, pp. 148-155.

*Primary Examiner* — Tony H Winner
*Assistant Examiner* — Michael R Stabley
(74) *Attorney, Agent, or Firm* — JCIPRNET

(57) ABSTRACT

The present invention relates to the technical field of climbing robots, and more specifically, to a high-mobility wheeled climbing robot, including a base, magnetic wheel modules, a tail wheel module, internal corner transition assistance mechanisms, and auxiliary moving wheels. When the tail wheel module is unfolded, the robot can be stably supported when creeping on a flat surface and crossing a structure such as an external corner or an edge of a thin plate and so on, and during storage, the tail wheel module is completely placed in the base without contacting with an environment; the internal corner transition assistance mechanisms allow the robot to cross an internal corner structure; and the auxiliary moving wheels can be used as a support wheel system for robot motion together with the tail wheel module, such that the robot can move on flat surfaces with any angles without rolling of the base.

17 Claims, 13 Drawing Sheets

(56) References Cited

U.S. PATENT DOCUMENTS

| | | | | |
|---|---|---|---|---|
| 10,589,430 B2 * | 3/2020 | Kossett | .................... | B25J 5/007 |
| 10,828,973 B2 * | 11/2020 | Kossett | ................ | B60K 7/0007 |
| 10,987,818 B2 * | 4/2021 | Kossett | .................. | B25J 19/023 |
| 2011/0174565 A1 | 7/2011 | Rochat et al. | | |

FOREIGN PATENT DOCUMENTS

| | | |
|---|---|---|
| CN | 113525558 | 10/2021 |
| CN | 116279881 | 6/2023 |
| CN | 116513334 | 8/2023 |
| CN | 116534153 | 8/2023 |

\* cited by examiner

HIGH-MOBILITY WHEELED CLIMBING ROBOT

CROSS-REFERENCE TO RELATED APPLICATION

This application claims the priority benefit of China application serial no. 202311780530.8, filed on Dec. 22, 2023. The entirety of the above-mentioned patent application is hereby incorporated by reference herein and made a part of this specification.

BACKGROUND

Technical Field

The present invention relates to the technical field of climbing robots, and more specifically, to a high-mobility wheeled climbing robot.

Related Art

A moving mechanism of a climbing robot mainly are wheeled or foot-type moving mechanism, wherein the wheeled moving mechanism easily meets work requirements of contact detection and close-range detection, and has the characteristics of high stability, low energy consumption, small required motion space, easy control, and the like. However, existing wheeled climbing robots have poor mobility, and most of them can only creep on flat surfaces due to their own wheel system configurations and structures, and have difficulty in crossing complex stereoscopic structures such as internal corners, external corners, edges of thin plates, and flanged edges, so as not to meet the requirements of climbing on the surfaces of large structures such as cabin interiors and exteriors, iron bridges, and engineering equipment.

In the Chinese patent with publication NO. CN116534153A, an adaptive magnetic wall-climbing robot capable of transiting an angled wall is disclosed, in which front wheels and rear wheels are rotatably mounted at the bottom of a front frame and the bottom of a rear frame, respectively; a magnetic adsorption system is arranged in a cavity of each wheel and includes a rotating shaft, a magnetic mounting seat, and a magnetic assembly; the rotating shaft is rotatably mounted in the cavity of the wheel and is concentric with the wheel; a connecting end of the magnetic mounting seat is fixedly connected to the rotating shaft; the outer wall surface of a free end of the magnetic mounting seat is an arc surface; the free end of the magnetic mounting seat is provided with a magnetic mounting cavity; the magnetic assembly is arranged in the magnetic mounting cavity; and the rotating shaft is driven by a regulating motor to rotate, and then the magnetic assembly is driven to rotate, so as to regulate the circumferential position of the magnetic assembly in the cavity of the wheel. According to the above invention, adsorption forces of the magnetic assemblies corresponding to the front and rear wheels are actively regulated in a mode that the magnetic assemblies are rotated by the motors, such that the magnetic wall-climbing robot can pass through the angled wall. Its disadvantage is that the rotation angle of the magnetic assembly needs to be accurately controlled in the whole transition process, otherwise the robot may fall off due to too small adsorption force, resulting in high difficulty of control and great risk. In addition, a certain distance is set between the front and rear wheels in the above invention, such that the robot cannot cross from one side to the other side of a thin plate.

SUMMARY OF INVENTION

Technical Problem

To overcome the deficiencies in the prior art, an objective of the present invention is to provide a high-mobility wheeled climbing robot, which can creep on flat surfaces with any angles and flexibly and quickly cross various complex stereoscopic structures such as an internal corner, an external corner, an edge of a thin plate, and a flanged edge, thereby greatly expanding the reachable range of creeping on the surfaces of large structures.

Solution to Problem

To solve the above technical problems, the present invention adopts the following technical solution:

There is provided a high-mobility wheeled climbing robot, including a base, magnetic wheel modules rotatably mounted on left and right sides of the base, a tail wheel module movably mounted on a rear side of the base and capable of being movably relative to the base and stored in the base, internal corner transition assistance mechanisms mounted on the rear side of the base, and auxiliary moving wheels rotatably mounted on a front side of the base, where each of the magnetic wheel modules includes a driving motor and a magnetic wheel connected to an output shaft of the driving motor; each of the internal corner transition assistance mechanisms includes a plurality of transition roller wheels rotatably mounted on the base in sequence, and a distance between a center of each of the plurality of transition roller wheels and a center of the magnetic wheel is gradually increased in a direction from the tail wheel module to the auxiliary moving wheels; and a sensor module is arranged on a front side of the base, a controller module and a battery module are arranged in the base, the battery module and the sensor module are connected to the controller module, and the controller module is connected to the driving motor.

In the high-mobility wheeled climbing robot according to the present invention, the magnetic wheel modules provide an adsorption force and a tractive capability for the robot; when the tail wheel module is unfolded, the robot can be stably supported when creeping on a flat surface and crossing a structure such as the external corner or the edge of the thin plate, and during storage, the tail wheel module is completely placed in the base without contact with an environment; the internal corner transition assistance mechanisms allow the robot to cross an internal corner structure, and the distance between the center of each of the plurality of transition roller wheels and the center of the magnetic wheel is gradually increased in the direction from the tail wheel module to the auxiliary moving wheels, such that the robot gradually separates from a first flat surface and smoothly transits to a second flat surface; and the auxiliary moving wheels can be used as a support wheel system for robot motion together with the tail wheel module, such that the robot can move on flat surfaces with any angles without rolling of the base and is not hindered from crossing various structures. The high-mobility wheeled climbing robot according to the present invention has the capabilities of creeping on the flat surfaces with any angles and crossing various complex stereoscopic structures such as the internal corner, the external corner, the edge of the thin plate, and the flanged edge and the like, thereby greatly improving the reachability of creeping on the surfaces of large structures, and meeting the requirements of safe, reliable, efficient, and flexible climbing and operation.

Further, when a first transition roller wheel is in contact with the first flat surface, an angle $\theta_1$ between a connecting line from the center of the magnetic wheel to a tangent point of the magnetic wheel and the first flat surface and a connecting line from the center of the transition roller wheel to the center of the magnetic wheel meets the following condition:

$$\theta_1 > \arcsin\frac{Fd_1}{\tau}$$

where F is an adsorption force between the magnetic wheel on one side and the first flat surface, r is a maximum driving torque of the driving motor corresponding to the magnetic wheel on one side, and $d_1$ is a distance between the center of the magnetic wheel and the center of the transition roller wheel. The internal corner structure is formed on an inner side of the first flat surface and an inner side of the second flat surface. When the robot transits from the first flat surface to the second flat surface, the above condition is met. When the robot passes through the internal corner structure, the transition roller wheels can separate the magnetic wheels from the first flat surface and transit the magnetic wheels to the second flat surface.

Further, the center (x, y) of each of the plurality of transition roller wheels is distributed on a circumference of a first circle and meets the following equation:

$$(x-R_1)^2+(y-R_1-d_2)^2=R_2^2$$

where $R_1$ is a radius of the magnetic wheel, $d_2$ is a distance between a center of the first circle and the center of the magnetic wheel, $R_2$ is a radius of the first circle, $R_2>R_1-d_2-r_1$, and $r_1$ is a radius of the transition roller wheel.

The distance between the center of each of the plurality of transition roller wheels and the center of the magnetic wheel is gradually increased in the direction from the tail wheel module to the auxiliary moving wheels, and the center of each transition roller wheel is distributed on the circumference of the first circle offset from the magnetic wheel and distributed in a gradual expansion shape, thereby causing the magnetic wheel to gradually separate from the first flat surface and smoothly transit to the second flat surface.

Further, the first flat surface is connected to the second flat surface, and when the first transition roller wheel is in contact with the first flat surface, the magnetic wheel is internally tangent to the first flat surface and the second flat surface, and an angle $\theta_2$ between a connecting line from the center of the magnetic wheel to a tangent point of the magnetic wheel and the second flat surface and a connecting line from a center of the auxiliary moving wheel to the center of the magnetic wheel meets the following condition:

$$\theta_2 > \arccos\left(\frac{R_1-r_2}{R_3}\right)$$

where $r_2$ is a radius of the auxiliary moving wheel, $R_3$ is a force arm of the auxiliary moving wheel, namely, a distance between the center of the auxiliary moving wheel and the center of the magnetic wheel, and $R_3>R_1-r_2$.

When the first transition roller wheel begins to contact with the first flat surface, the auxiliary moving wheel does not contact with the second flat surface, and the magnetic wheel contacts with the second flat surface and generates the adsorption force. If the magnetic wheel does not contact with the second flat surface when separating from the first flat surface under the action of the internal corner transition assistance mechanism, the robot falls as the magnetic wheel is not adsorbed on any flat surface. The auxiliary moving wheels meeting the above condition will not hinder the robot from crossing the internal corner structure.

Further, the magnetic wheel includes a wheel hub, a magnetic ring, and a rubber ring, where the wheel hub is connected to the output shaft of the driving motor; the magnetic ring is fixedly mounted on the wheel hub; and the rubber ring is connected to a periphery of the wheel hub and an outer diameter of the rubber ring is greater than an outer diameter of the magnetic ring. The outer diameter of the rubber ring is slightly greater than an outer diameter of the wheel hub and the outer diameter of the magnetic ring, thereby ensuring that the rubber ring rather than the wheel hub or the magnetic ring contacts with the flat surface where the robot is located, protecting the magnetic ring from collision, and providing a sufficient frictional force.

Further, the magnetic ring is of an axial magnetization ring magnetic structure or a Halbach permanent magnet array that is annularly distributed. The axial magnetization ring magnetic structure may be an axial magnetization ring permanent magnet, or a ring electromagnet or an electro-permanent magnet array with the same magnetic circuit effect as the axial magnetization ring permanent magnet. A magnetic force of the axial magnetization ring permanent magnet is uniform in a circumferential direction, making the robot motion more stable. The Halbach permanent magnet array can provide a strong adsorption force.

Further, the tail wheel module includes a tail wheel motor, a tail wheel swing rod, and a tail roller wheel, where the tail roller wheel is rotatably mounted on the tail wheel swing rod; the tail wheel swing rod is connected to an output shaft of the tail wheel motor; the tail wheel motor is mounted in the base; and the base is provided with an opening for the tail roller wheel and the tail wheel swing rod to rotate into.

Further, a distance $R_4$ between the tail wheel and a rotation center of the tail wheel meets the following condition:

$$R_1-d_3-r_3<R_4<R_1-r_3$$

where the rotation center of the tail roller wheel is located directly under the center of the magnetic wheel, $d_3$ is a distance between the rotation center of the tail roller wheel and the center of the magnetic wheel, and $r_3$ is a radius of the tail roller wheel. $R_4<R_1-r_3$, which ensures that the tail wheel module can be completely placed in the base without contacting with the environment during storage; and $R_4>R_1-d_3-r_3$, which ensures that the tail roller wheel can protrude from the base to serve as a support wheel when unfolded.

Further, the base is cylindrical and includes a base body and a cover body detachably connected to each other; and a cavity capable of accommodating the controller module, the battery module, and the sensor module is formed between the base body and the cover body. The cover body is detachable relative to the base body, making it easy to repair an internal structure of the robot. The base is cylindrical in shape, and the controller module, the battery module, the sensor module, and the driving motors of the magnetic wheel modules are all placed in the base, thereby making it difficult for the robot to collide with the environment to hinder the motion, and achieving low center of gravity and small moment of inertia.

Further, there are two internal corner transition assistance mechanisms rotatably connected to a left side and a right side of the base body, respectively; there are two auxiliary moving wheels rotatably connected to the left side and the right side of the base body, respectively; and there is one tail wheel module located between the two internal corner transition assistance mechanisms and capable of being completely stored inside the base. When the tail wheel module is unfolded, the tail roller wheel forms triangular support with the magnetic wheel modules on two sides or the transition roller wheels of the two internal corner transition assistance mechanisms, thereby ensuring the stable motion of the robot according to the present invention.

Compared with the prior art, the present invention has the following beneficial effects:

In the high-mobility wheeled climbing robot according to the present invention, the internal corner transition assistance mechanisms are provided, such that the magnetic wheels of the robot can gradually separate from the first flat surface and always keep in contact with the second flat surface, thereby causing the robot to easily and stably pass through the internal corner structure, avoiding complex control, and achieving a lightweight, stable and reliable structure.

In the high-mobility wheeled climbing robot according to the present invention, when the tail wheel module is unfolded, the robot can be stably supported when creeping on the flat surface and crossing the structure such as the external corner or the edge of the thin plate and so on, and during storage, the tail wheel module is completely placed in the base without contacting with the environment; and through the storage and unfolding of the tail wheel module, the robot is easy to be controlled in switching between motion forms and has good adaptability.

In the high-mobility wheeled climbing robot according to the present invention, the auxiliary moving wheels can be used as a support wheel system for robot motion together with the tail wheel module, such that the robot can move on the flat surfaces with any angles without rolling of the base and is not hindered from crossing various structures, thereby ensuring that an observation area of the sensor module does not shake due to the robot motion.

Effects of Invention

The high-mobility wheeled climbing robot according to the present invention has the capabilities of creeping on the flat surfaces with any angles and crossing various complex stereoscopic structures such as the internal corner, the external corner, the edge of the thin plate, the flanged edge, and so on, thereby greatly improving the reachability of creeping on the surfaces of large structures, and meeting the requirements of safe, reliable, efficient, and flexible climbing and operation.

Figure 1:
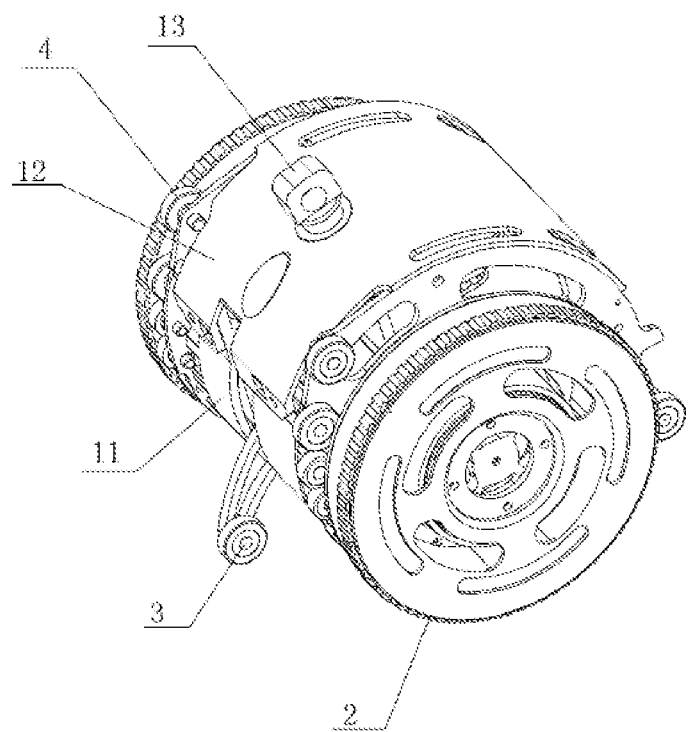
FIG. 1 is a schematic structural diagram of a high-mobility wheeled climbing robot.

In the drawings: 1. base; 11. base body; 12. cover body; 13. safety hook; 2. magnetic wheel module; 21. driving motor; 22. magnetic ring; 23. rubber ring; 24. wheel hub; 25. ring baffle; 26. coupling; 3. tail wheel module; 32. tail wheel swing rod; 33. tail roller wheel; 4. transition roller wheel; 5. auxiliary moving wheel; 6. sensor module; 7. controller module; and 8. battery module.

DESCRIPTION OF EMBODIMENTS

The present invention is further described below in conjunction with the specific embodiments. The accompanying drawings are only used for exemplary description, represent schematic diagrams only, not physical diagrams, and cannot be construed as a limitation to this patent. In order to better illustrate the embodiments of the present invention, some components in the accompanying drawings may be omitted, zoomed in or zoomed out, and do not represent the actual size of a product. It can be understood by those skilled in the art that some well-known structures and their descriptions may be omitted in the accompanying drawings.

The same or similar reference signs in the accompanying drawings of the embodiments of the present invention are corresponding to the same or similar components. In the description of the present invention, it should be understood that the orientations or positional relationships indicated by the terms "upper", "lower", "left", "right", etc. are based on the orientations or positional relationships shown in the accompanying drawings, merely for the convenience of describing the present invention and simplifying the description, rather than indicating or implying that the apparatus or element referred to must have a particular orientation or be constructed and operated in a particular orientation, and therefore cannot be understood as a limitation to this patent. Those of ordinary skill in the art can understand specific meanings of the above terms according to specific circumstances.

EMBODIMENT

This embodiment is an embodiment of a high-mobility wheeled climbing robot, as shown in FIG. 1 to FIG. 5. The high-mobility wheeled climbing robot includes a base 1, magnetic wheel modules 2 rotatably mounted on left and right sides of the base 1, a tail wheel module 3 movably mounted on a rear side of the base 1 and capable of being movably stored into the base 1 relative to the base 1, internal corner transition assistance mechanisms mounted on the rear side of the base 1, and auxiliary moving wheels 5 rotatably mounted on a front side of the base 1, where each of the magnetic wheel modules 2 includes a driving motor 21 and a magnetic wheel connected to an output shaft of the driving motor 21; each of the internal corner transition assistance mechanisms includes a plurality of transition roller wheels 4 rotatably mounted on the base 1 in sequence, and a distance between a center of each of the plurality of transition roller wheels 4 and a center of the magnetic wheel is gradually increased in a direction from the tail wheel module 3 to the auxiliary moving wheels 5; and a sensor module 6 is arranged on a front side of the base 1, a controller module 7 and a battery module 8 are arranged in the base 1, the battery module 8 and the sensor module 6 are connected to the controller module 7, and the controller module 7 is connected to the driving motor 21. The sensor module 6 may be configured as a camera. When the sensor module 6 is arranged in the base 1, in order to implement normal camera shooting, a hole for shooting can be provided in a position of the base 1 that corresponds to the camera in this embodiment, and in order to implement dust and water prevention, a transparent cover can be arranged at the hole for shooting in this embodiment. A forward motion direction of the robot is a front side. In addition, in this embodiment, the amount of transition roller wheels 4 may set to be four, and internal corner transition can be implemented by a small amount of transition roller wheels 4. Certainly, the amount of transition roller wheels 4 in the present invention is not limited to four. In this embodiment, it is designed that a distance between a center of the auxiliary moving wheel 5 and the center of the magnetic wheel, the distance between the center of any transition roller wheel 4 and the center of the magnetic wheel, and a distance between a center of the tail wheel module 3 and the center of the magnetic wheel are respectively not less than a difference between a radius of the magnetic wheel and a radius of the corresponding transition roller wheel 4, such that the auxiliary moving wheel 5, the transition roller wheel 4, and a tail roller wheel 33 all have the conditions to become support wheels during robot motion, where the center of the tail wheel module 3 is the center of the tail roller wheel 33 when the tail wheel module is unfolded.

In this embodiment, when the tail wheel module 3 is unfolded, the robot can be stably supported when creeping on a flat surface and crossing a structure such as an external corner or a thin plate and so on, and during storage, the tail wheel module is completely placed in the base without contact with an environment; the internal corner transition assistance mechanisms are arranged, such that the magnetic wheels of the robot can gradually separate from a first flat surface and always keep in contact with a second flat surface, thereby causing the robot to easily and stably pass through an internal corner structure, avoiding complex control, and achieving a lightweight, stable and reliable structure; and the auxiliary moving wheels 5 can be used as a support wheel system for robot motion together with the tail roller wheel 33, such that the robot can move on flat surfaces with any angles without rolling of the base and is not hindered from crossing various structures, thereby ensuring that a sensing area of the sensor module is not affected by the robot motion.

Figure 6:
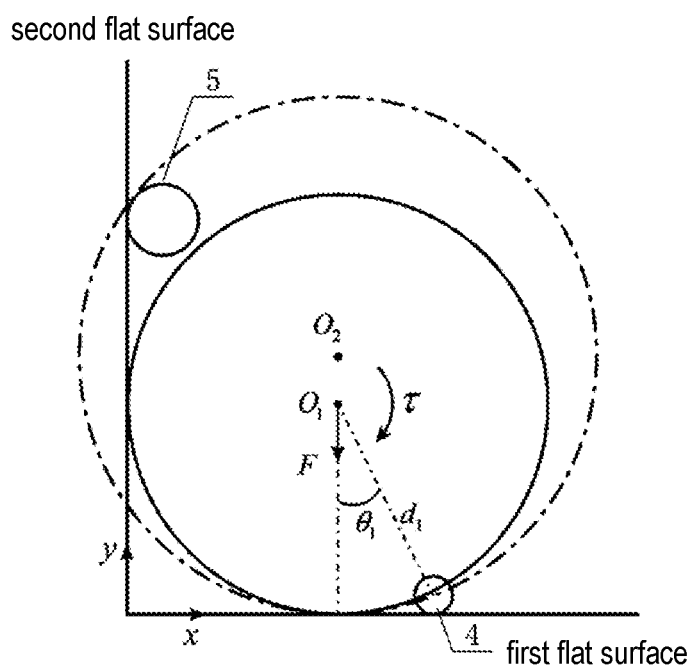
FIG. 6 is a schematic diagram in which a first transition roller wheel is in contact with a first flat surface and magnetic wheels gradually separate from the first flat surface.

For transition of the internal corner structure, the internal corner structure is formed on an inner side of the first flat surface and an inner side of the second flat surface, and the robot transits from the first flat surface to the second flat surface. The transition roller wheel 4 contacts with the first flat surface so as to force the magnetic wheel to gradually separate from the first flat surface. Therefore, as shown in FIG. 6, an arrow in the figure represents a direction of a counter torque of the driving motor 21 to the base 1. When a first transition roller wheel 4 is in contact with the first flat surface, an angle $\theta_1$ between a connecting line from the center O of the magnetic wheel to a tangent point of the magnetic wheel and the first flat surface and a connecting line from the center of the transition roller wheel 4 to the center $O_1$ of the magnetic wheel meets the following condition:

$$\theta_1 > \arcsin\frac{Fd_1}{\tau}$$

where F is an adsorption force between the magnetic wheel on one side and the first flat surface, r is a maximum driving torque of the driving motor 21 corresponding to the magnetic wheel on one side, and $d_1$ is a distance between the center of the magnetic wheel and the center of the transition roller wheel 4. When the above condition is met and the robot passes through the internal corner structure, the transition roller wheels can separate the magnetic wheels from the first flat surface.

Figure 7:
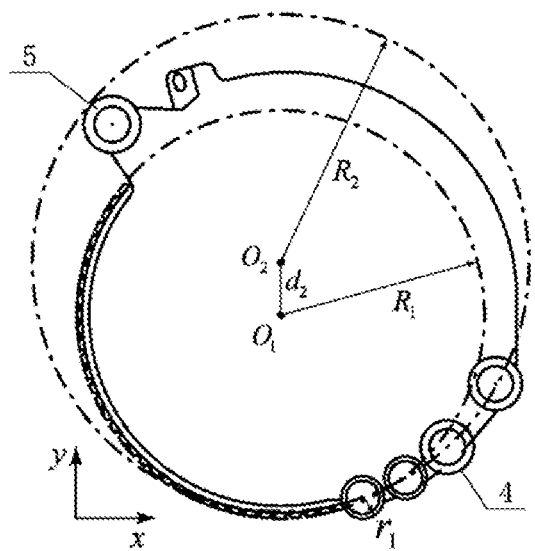
FIG. 7 is a schematic diagram in which the centers of a plurality of transition roller wheels are distributed on a circumference of a first circle.

In one embodiment, in order to make the magnetic wheels gradually separate from the first flat surface and smoothly transit to the second flat surface, in this embodiment, as shown in FIG. 7, the centers (x, y) of the plurality of transition roller wheels 4 are distributed on a circumference of a first circle and meets the following equation:

$$(x-R_1)^2+(y-R_1-d_2)^2=R_2^2$$

where $R_1$ is the radius of the magnetic wheel, $d_2$ is a distance between a center $O_2$ of the first circle and the center $O_1$ of the magnetic wheel, $R_2$ is a radius of the first circle, the center $O_2$ of the first circle is arranged directly above the center $O_1$ of the magnetic wheel, $R_2>R_1-d_2-r_1$, and $r_1$ is the radius of the transition roller wheel 4. In this way, the distance between the center of each of the plurality of transition roller wheels 4 and the center $O_1$ of the magnetic wheel is gradually increased in the direction from the tail wheel module 3 to the auxiliary moving wheels 5, and the center of each transition roller wheel 4 is distributed on the circumference of the first circle offset from a circumference of the magnetic wheel, and distributed in a gradual expansion shape, thereby implementing smooth transition. A connecting edge for connecting the transition roller wheels 4 may be arranged at a periphery of the base 1, thereby further simplifying the structure and mounting of the transition roller wheels 4.

Figure 8:
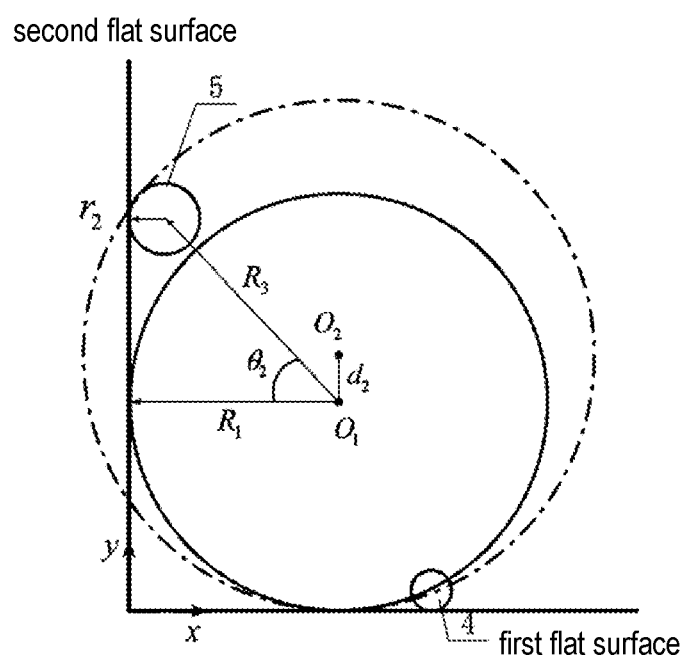
FIG. 8 is a schematic diagram in which magnetic wheels keep in contact with a second flat surface in the entire process that a robot passes through an internal corner structure.

In one embodiment, in order to ensure that the magnetic wheels keep in contact with the second flat surface in the entire process that the robot passes through the internal corner structure to implement stable and reliable creeping and transition of the robot, in this embodiment, as shown in FIG. 8, when the first transition roller wheel 4 is in contact with the first flat surface, the magnetic wheel is internally tangent to the first flat surface and the second flat surface, the first flat surface is connected to the second flat surface, and an angle $\theta_2$ between a connecting line from the center of the magnetic wheel to a tangent point of the magnetic wheel and the second flat surface and a connecting line from the center of the auxiliary moving wheel 5 to the center $O_1$ of the magnetic wheel meets the following condition:

$$\theta_2 > \arccos\left(\frac{R_1 - r_2}{R_3}\right)$$

where $r_2$ is a radius of the auxiliary moving wheel 5, and $R_3$ is a force arm of the auxiliary moving wheel 5, namely, a distance between the center of the auxiliary moving wheel 5 and the center of the magnetic wheel. When the first transition roller wheel 4 contacts with the first flat surface, the auxiliary moving wheel 5 does not contact with the second flat surface, and the magnetic wheel contacts with the second flat surface and generates the adsorption force. If the magnetic wheel does not contact with the second flat surface when separating from the first flat surface under the action of the internal corner transition assistance mechanism, the robot falls as the magnetic wheel is not adsorbed on any flat surface. Only the auxiliary moving wheels 5 meeting the above condition will not hinder the robot from crossing the internal corner structure and can ensure the smoothness of transition of the robot from the first flat surface to the second flat surface.

In one embodiment, the tail wheel module 3 includes a tail wheel motor, a tail wheel swing rod 32, and the tail roller wheel 33, where the tail roller wheel 33 is rotatably mounted on the tail wheel swing rod 32; the tail wheel swing rod 32 is connected to an output shaft of the tail wheel motor; the tail wheel motor is mounted in the base 1; and the base 1 is provided with an opening for the tail roller wheel 33 and the tail wheel swing rod 32 to rotate into. During implementation, a completely unfolded state of the tail roller wheel 33 is an initial state, and the tail wheel motor drives the tail wheel swing rod 32 to rotate the tail roller wheel 33, such that the tail wheel swing rod 32 and the tail roller wheel 33 can be both stored inside the base 1. The tail roller wheel 33 can stay at any position within an operating stroke of the tail wheel motor and serve as a support wheel for creeping on the flat surfaces with any angles, and when the position of the tail roller wheel 33 is adjusted, an observation area of the sensor module 6 changes accordingly, which is equivalent to the adjustment of a pitch angle of the sensor module 6.

Figure 9:
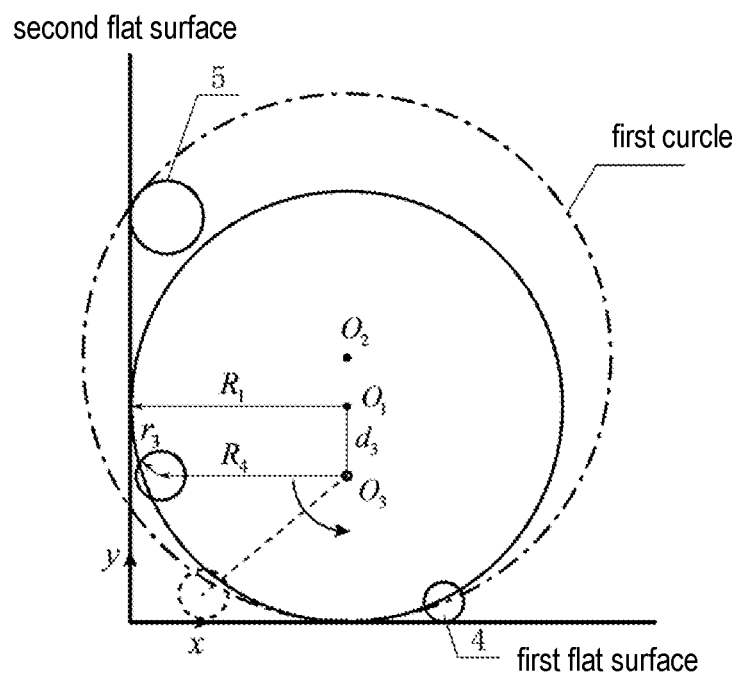
FIG. 9 is a schematic diagram in which a distance between a center of a tail roller wheel and a rotation center of the tail roller wheel needs to meet a condition.

In order to simultaneously meet the requirements for the tail roller wheel 33 to serve as the support wheel and be stored, in this embodiment, as shown in FIG. 9, a distance $R_4$ between the tail roller wheel 33 and a rotation center $O_3$ of the tail roller wheel 33 meets the following condition:

$$R_1-d_3-r_3 < R_4 < R_1-r_3$$

where the rotation center $O_3$ of the tail roller wheel 33 is located directly under the center of the magnetic wheel, $d_3$ is a distance between the rotation center of the tail roller wheel 33 and the center of the magnetic wheel, and $r_3$ is a radius of the tail roller wheel 33. $R_4<R_1-r_3$, which ensures that the tail wheel module 3 can be completely placed in the base 1 without contacting with the environment during storage; and $R_4>R_1-d_3-r_3$, which ensures that the tail roller wheel 3 can protrude from the base 1 to serve as the support wheel when unfolded.

Figure 10:
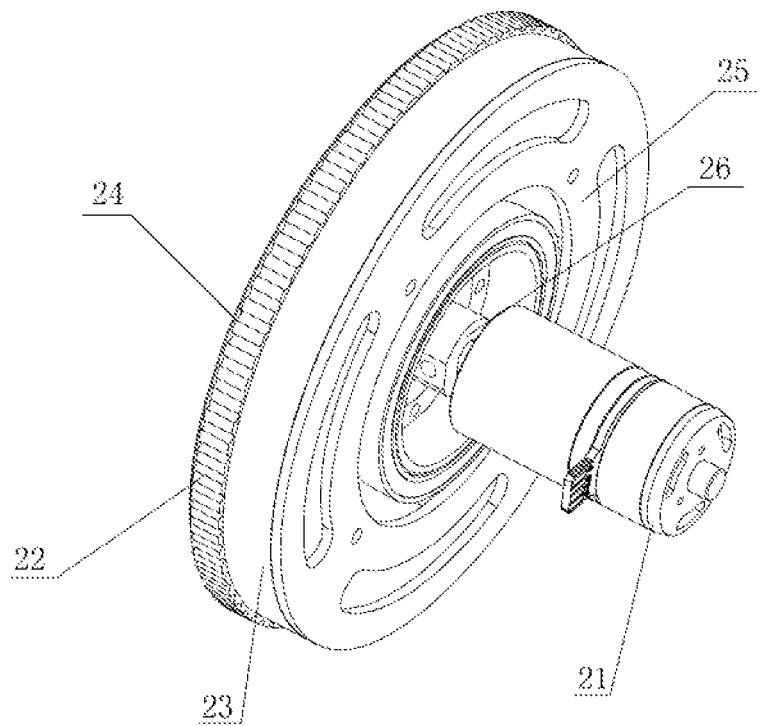
FIG. 10 is a schematic structural diagram of a magnetic wheel module.
Figure 11:
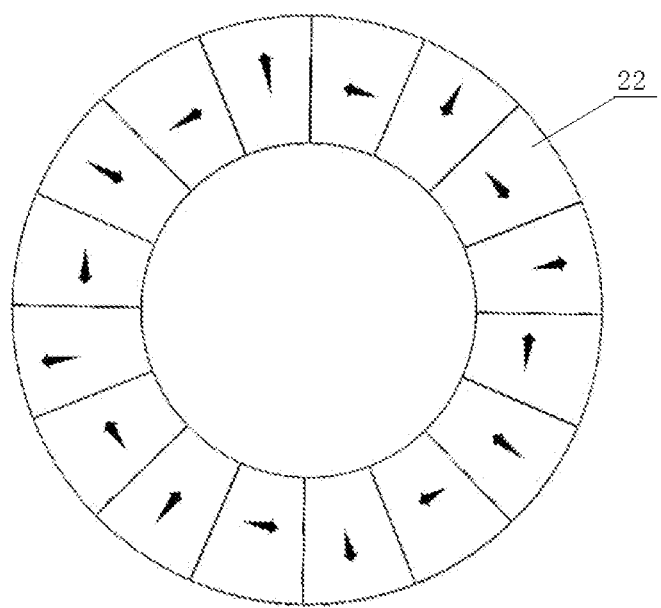
FIG. 11 is a schematic structural diagram of a magnetic ring.

In one embodiment, the magnetic wheel includes a wheel hub 24, a magnetic ring 22, and a rubber ring 23, where the wheel hub 24 is connected to the output shaft of the driving motor 21; the magnetic ring 22 is fixedly mounted on the wheel hub 24; and the rubber ring 23 is connected to a periphery of the wheel hub 24 and an outer diameter of the rubber ring 23 is greater than an outer diameter of the magnetic ring 22, as shown in FIG. 10. Specifically, the outer diameter of the rubber ring 23 is greater than the outer diameter of the magnetic ring 22 by 2-4 mm, but the specific numerical value is not used as a further limitation to the present invention. The outer diameter of the rubber ring 23 is slightly greater than an outer diameter of the wheel hub 24 and the outer diameter of the magnetic ring 22, thereby ensuring that the rubber ring 23 rather than the wheel hub 24 or the magnetic ring 22 contacts with the flat surface where the robot is located, protecting the magnetic ring 22 from collision, and providing a sufficient frictional force. The magnetic ring 22 is an axial magnetization ring permanent magnet, a ring electromagnet or electro-permanent magnet with the same magnetic circuit effect as the axial magnetization ring permanent magnet, or a Halbach permanent magnet array that is annularly distributed, as shown in FIG. 11. A magnetic force of the axial magnetization ring permanent magnet is uniform in a circumferential direction, making the robot motion more stable. The Halbach permanent magnet array can provide a stronger adsorption force, but it should be ensured that the adsorption force fluctuates within a small range when the magnetic wheels rotate. In addition, ring baffles 25 may be arranged on two sides of the wheel hub 24 to make the appearance of the robot attractive, and a coupling 26 is arranged at a joint of the driving motor 21 and the wheel hub 24.

Figure 3:
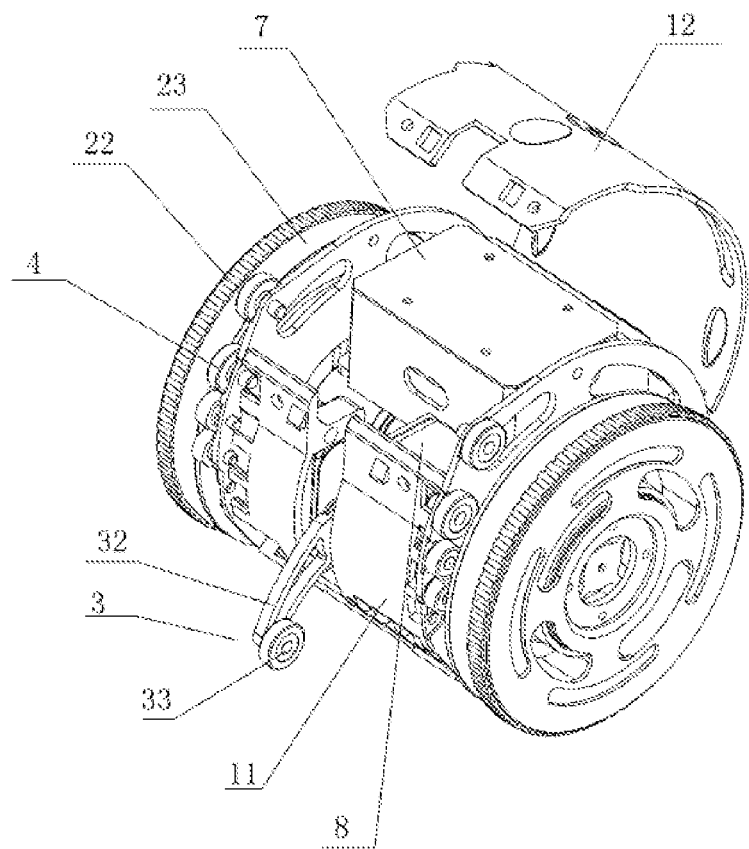
FIG. 3 is a schematic structural diagram of a high-mobility wheeled climbing robot when a cover body is opened and a tail wheel module is unfolded.
Figure 4:
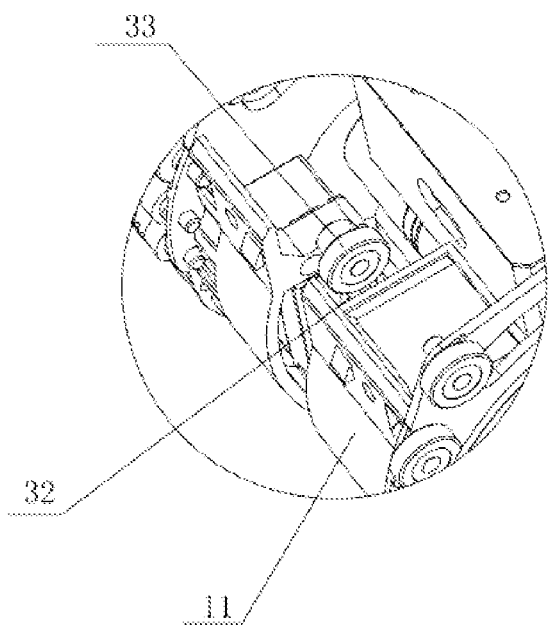
FIG. 4 is a schematic diagram of a state where a tail wheel is stored in the base.
Figure 5:
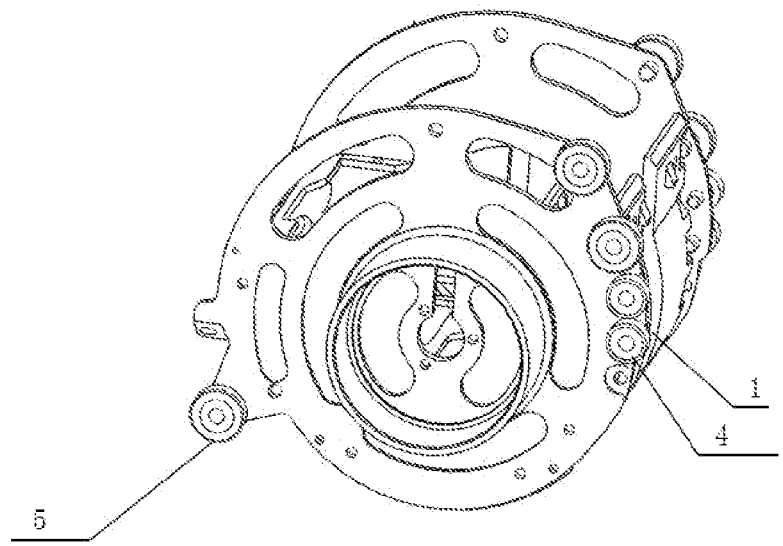
FIG. 5 is a schematic structural diagram of a base.
Figure 12:
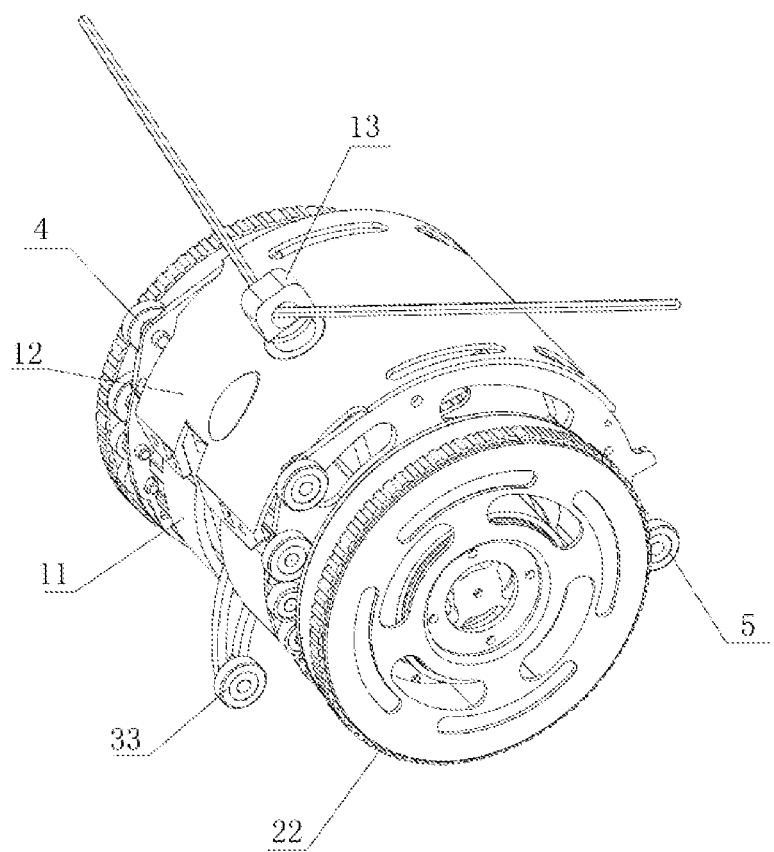
FIG. 12 is a schematic structural diagram in which a high-mobility wheeled climbing robot according to the present invention is hung on a safety rope.

In one embodiment, the base 1 is cylindrical and includes a base body 11 and a cover body 12 detachably connected to each other; and a cavity capable of accommodating the controller module 7, the battery module 8, and the sensor module 6 is formed between the base body 11 and the cover body 12, as shown in FIG. 3. The cover body 12 is detachable relative to the base body 11, making it easy to repair an internal structure of the robot. The base 1 is cylindrical in shape, and the controller module 7, the battery module 8, the sensor module 6, and the driving motors 21 of the magnetic wheel modules 2 are all placed in the base 1, thereby making it difficult for the robot to collide with the environment to hinder the motion, and achieving low center of gravity and small moment of inertia. The cover body 12 is of an arc surface structure and has one end hinged to the base 1 and the other end provided with a buckling part, and the base 1 is provided with a clamping part in clamped connection with the buckling part; or the other end of the cover body 12 is provided with the clamping part, and the base 1 is provided with the buckling part in clamped connection with the clamping part. The cover body 12 is connected to the base body 11 by a buckle for easy mounting and dismounting. In this embodiment, a safety hook 13 is further arranged on the cover body 12 and provided with a rotating shaft capable of rotating in a full circle, and a safety rope can be hung on the safety hook to ensure the safety of the robot during use, as shown in FIG. 12.

Figure 2:
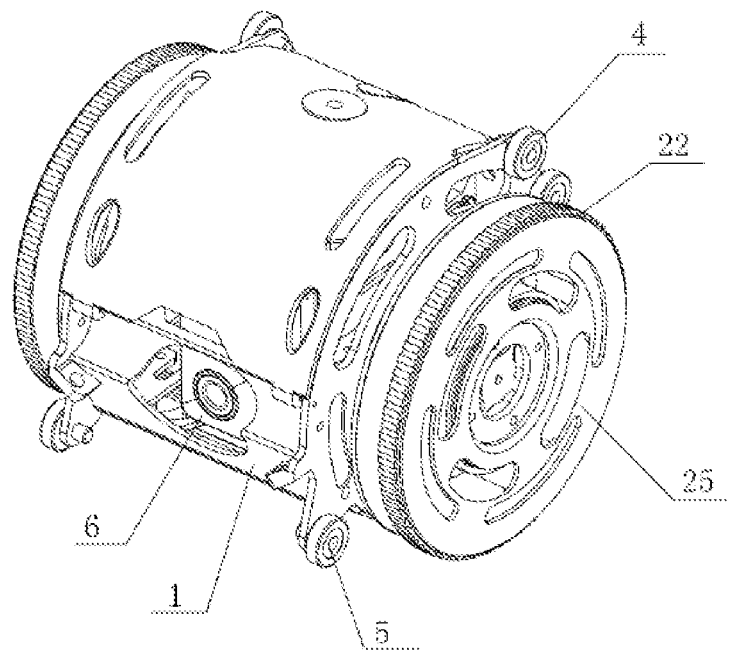
FIG. 2 is a schematic structural diagram of a high-mobility wheeled climbing robot when a cover body is closed.

In one embodiment, there are two internal corner transition assistance mechanisms rotatably connected to a left side and a right side of the base body 11, respectively; there are two auxiliary moving wheels 5 rotatably connected to the left side and the right side of the base body 11, respectively; and there is one tail wheel module 3 located between the two internal corner transition assistance mechanisms and capable of being completely stored inside the base, as shown in FIG. 1 and FIG. 2. When the tail wheel module is unfolded, the tail roller wheel 33 forms triangular support with the magnetic wheel modules on two sides or the transition roller wheels 4 of the two internal corner transition assistance mechanisms, thereby ensuring the stable motion of the robot according to the present invention.

The high-mobility wheeled climbing robot according to the present invention can flexibly transit various structures. When the tail wheel module 3 is unfolded, the transition on the structures such as the external corner and the edge of the thin plate and the like can be implemented. When the tail wheel module 3 is stored in the base 1, the transition on the structure such as the internal corner and the like can be implemented through the internal corner transition assistance mechanisms. The transition on the complex assembled structure such as the flanged edge and the like can be implemented through the cooperation between the actions of unfolding and storing the tail wheel module and the motion of the robot. The specific process is carried out by steps below.

Figure 13:
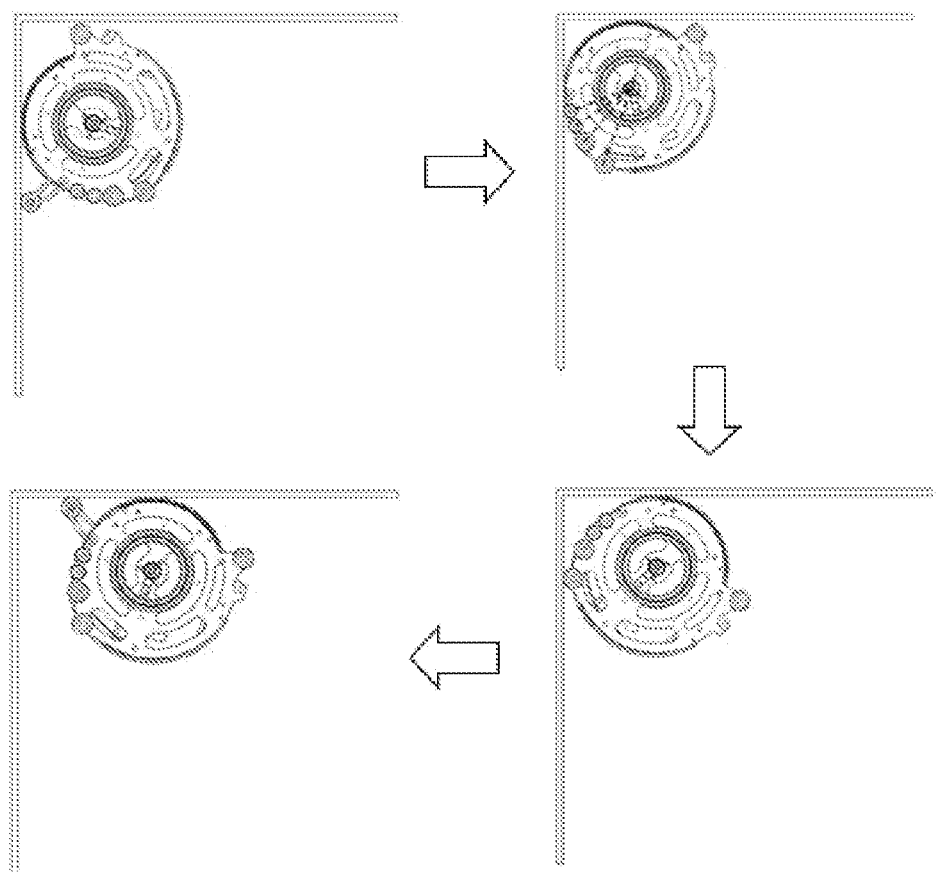
FIG. 13 is a schematic diagram in which a high-mobility wheeled climbing robot according to the present invention passes through a right-angled internal corner.
Figure 14:
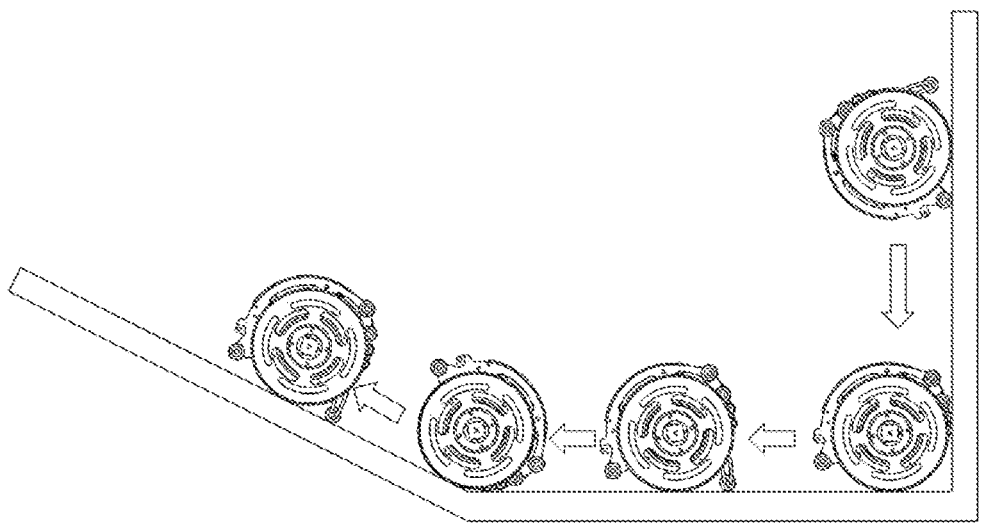
FIG. 14 is a schematic diagram in which a high-mobility wheeled climbing robot according to the present invention continuously passes through a right-angled internal corner and an obtuse-angled internal corner.

In a step of passing through the internal corner structure, the internal corner is formed between the first flat surface and the second flat surface, where the internal corner may be right-angled or obtuse-angled. For the step, reference is made to FIG. 13, in which arrows represent a motion direction of the robot. The tail roller wheel 33 is controlled to be stored in the base 1. When the first transition roller wheel 4 contacts with the first flat surface, the magnetic wheel begins to separate from the first flat surface, the adsorption force on the first flat surface is reduced, and the magnetic wheel contacts with the second flat surface and generates the adsorption force. When there are four transition roller wheels 4, a second transition roller wheel 4 contacts with the first flat surface along with the motion; at this time, a distance between the magnetic wheel and the first flat surface is increased, and the adsorption force on the first flat surface is continuously reduced; and then, a third transition roller wheel 4 and a fourth transition roller wheel 4 also continue to contact with the first flat surface, such that the distance between the magnetic wheel and the first flat surface is long enough without any adsorption force, thereby realizing that the magnetic wheels separate from the first flat surface and eventually transit to the second flat surface. During this process, the magnetic wheels always keep in contact with the second flat surface to ensure the safety and reliability of the robot. According to the step of passing through the inner corner structure, the robot according to the present invention can continuously pass through a plurality of internal corners, for example, the robot circumferentially passes through an inner wall of a square tubular structure or a polygonal tubular structure; and for another example, continuous transition on the internal corner structure with a right angle and an obtuse angle can be implemented, as shown in FIG. 14, where arrows represent a motion direction of the robot.

Figure 15:
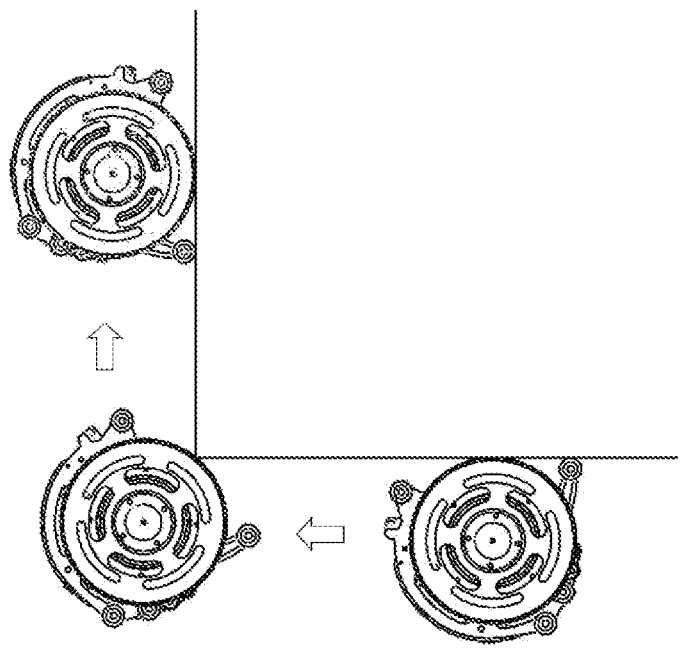
FIG. 15 is a schematic diagram in which a high-mobility wheeled climbing robot according to the present invention passes through a right-angled external corner.
Figure 16:
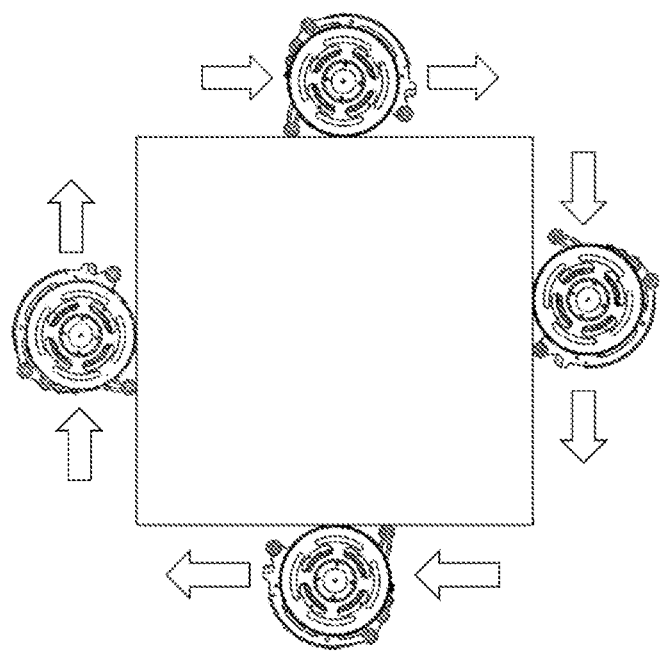
FIG. 16 is a schematic diagram in which a high-mobility wheeled climbing robot according to the present invention continuously passes through a plurality of right-angled external corners.
Figure 17:
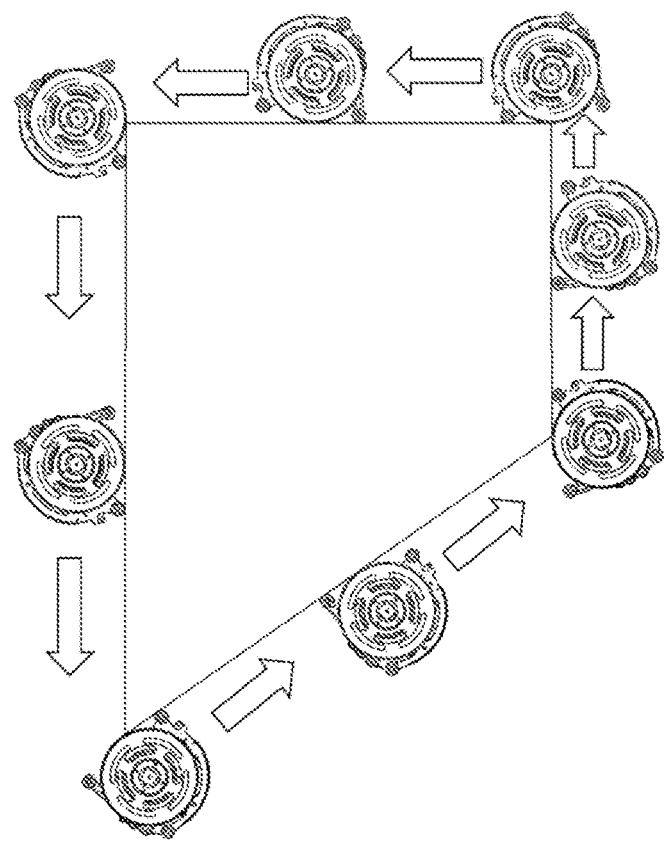
FIG. 17 is a schematic diagram in which a high-mobility wheeled climbing robot according to the present invention continuously passes through a plurality of right-angled external corners and obtuse-angled external corners.

In a step of passing through an external corner structure, the external corner is formed between the first flat surface and the second flat surface, where the external corner may be right-angled or obtuse-angled. For the step, reference is made to FIG. 15, in which arrows represent a motion direction of the robot. When controlled to be unfolded relative to the base 1, the tail roller wheel 33 serves as the support wheel, and the transition roller wheels 4 do not contact with the first flat surface. When reaching a joint of the first flat surface and the second flat surface, the robot rolls to the second flat surface around the joint from the first flat surface, and the auxiliary moving wheels 5 do not contact with the second flat surface. According to the step of passing through the external corner structure, the robot according to the present invention can continuously pass through various external corners, for example, the robot circumferentially passes through an outer wall of the square tubular structure, as shown in FIG. 16, where arrows represent a motion direction of the robot; and for another example, the robot circumferentially passes through an outer wall of the polygonal tubular structure, where the outer wall includes right-angled external corners and obtuse-angled external corners, as shown in FIG. 17, in which arrows represent a motion direction of the robot.

The thin plate is provided with a first surface and a second surface arranged in a relatively parallel manner, and a step of crossing the thin plate is as follows.

Figure 18:
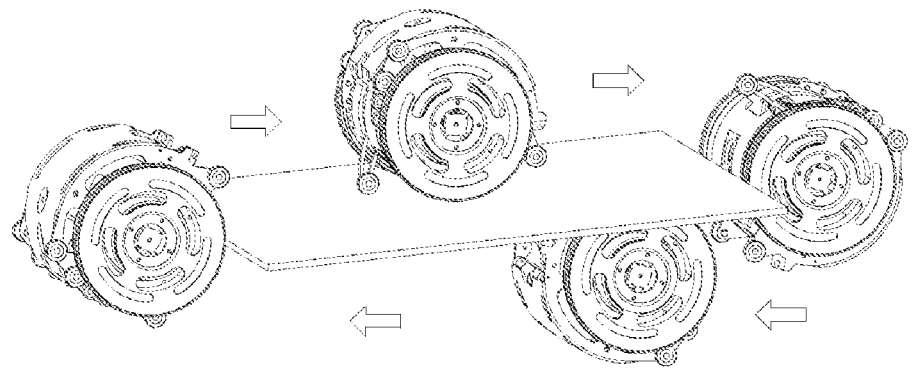
FIG. 18 is a schematic diagram in which a high-mobility wheeled climbing robot according to the present invention crosses an edge of a horizontal thin plate.
Figure 19:
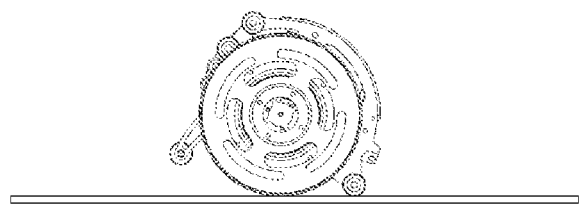
FIG. 19 is a schematic diagram in which a high-mobility wheeled climbing robot according to the present invention is supported on a horizontal thin plate by auxiliary moving wheels.

When the thin plate is horizontal, the first surface and the second surface are both arranged horizontally. At the beginning, when controlled to be unfolded relative to the base 1, the tail roller wheel 33 serves as the support wheel, and the transition roller wheels 4 do not contact with the first surface. When reaching the edge of the thin plate, the robot rolls to the second surface around the edge of the thin plate, the auxiliary moving wheels 5 contact with the second surface, and an angle of the tail roller wheel 33 is controlled to make the tail roller wheel 33 and the auxiliary moving wheels 5 contact with the second surface simultaneously, as shown in FIG. 18, where arrows represent a motion direction of the robot. Certainly, when the robot moves on a horizontal flat surface, the auxiliary moving wheels 5 can be used as support wheels, or the auxiliary moving wheels 5 and the tail roller wheel 33 together serve as the support wheel system. A schematic diagram of using the auxiliary moving wheels 5 as the support wheels is as shown in FIG. 19.

Figure 20:
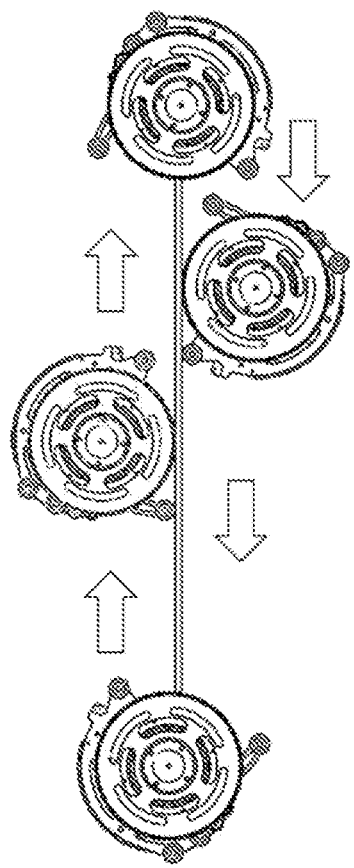
FIG. 20 is a schematic diagram in which a high-mobility wheeled climbing robot according to the present invention crosses an edge of a vertical thin plate.
Figure 21:
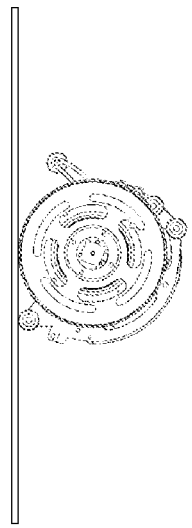
FIG. 21 is a schematic diagram in which a high-mobility wheeled climbing robot according to the present invention is supported on a vertical thin plate by auxiliary moving wheels.

When the thin plate is vertical, the first flat surface and the second flat surface are both arranged vertically. When the robot moves on the first flat surface from bottom to top or moves on the second flat surface from top to bottom and is located on the first flat surface, the tail roller wheel 33 is controlled to be unfolded relative to the base 1 and serves as the support wheel, and the transition roller wheels 4 do not contact with the first surface. When reaching the edge of the thin plate, the robot rolls to the second surface around the edge of the thin plate, and the auxiliary moving wheels 5 contact with the second surface and serve as the support wheels, as shown in FIG. 20, where arrows represent a motion direction of the robot. It should be noted that when the robot moves on a vertical flat surface, the auxiliary moving wheels 5 can be used as the support wheels, or the auxiliary moving wheels 5 and the tail roller wheel 33 together serve as the support wheel system. A schematic diagram of using the auxiliary moving wheels 5 as the support wheels is as shown in FIG. 21.

Figure 22:
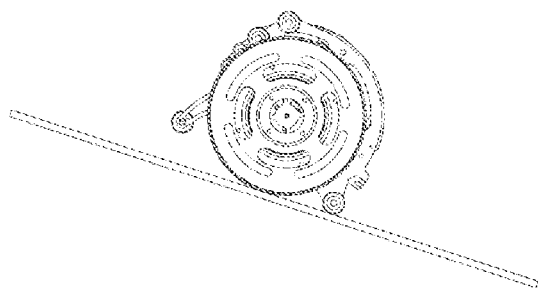
FIG. 22 is a schematic diagram in which a high-mobility wheeled climbing robot according to the present invention is supported on an inclined thin plate by auxiliary moving wheels.

When the thin plate is inclined, the first flat surface and the second flat surface are both arranged obliquely. The step that the robot crosses the edge of the inclined thin plate is similar to the process of crossing the edge of the horizontal thin plate and the edge of the vertical thin plate. It should be noted that when the robot moves on the inclined flat surface, the tail roller wheel 33 may be used as the support wheel, the auxiliary moving wheels 5 may be used as the support wheel, or the auxiliary moving wheels 5 and the tail roller wheel 33 together serve as the support wheel system. A schematic diagram of using the auxiliary moving wheels 5 as the support wheels is as shown in FIG. 22.

Figure 23:
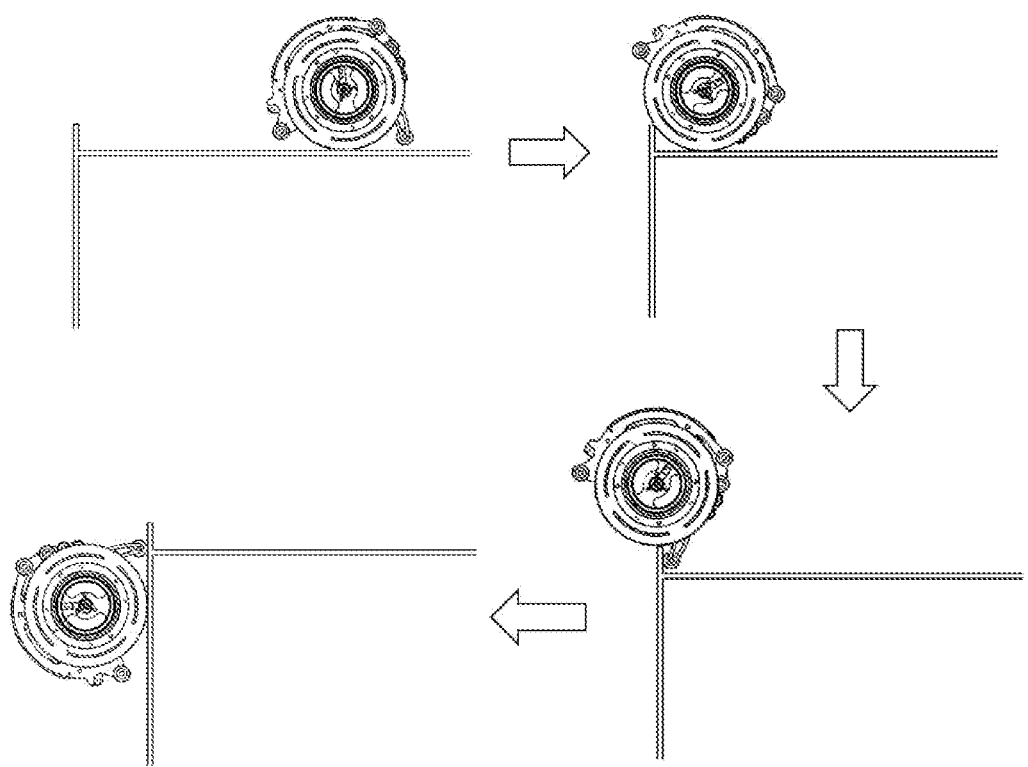
FIG. 23 is a schematic diagram in which a high-mobility wheeled climbing robot according to the present invention crosses a flanged edge from a horizontal thin plate to a vertical thin plate.
Figure 24:
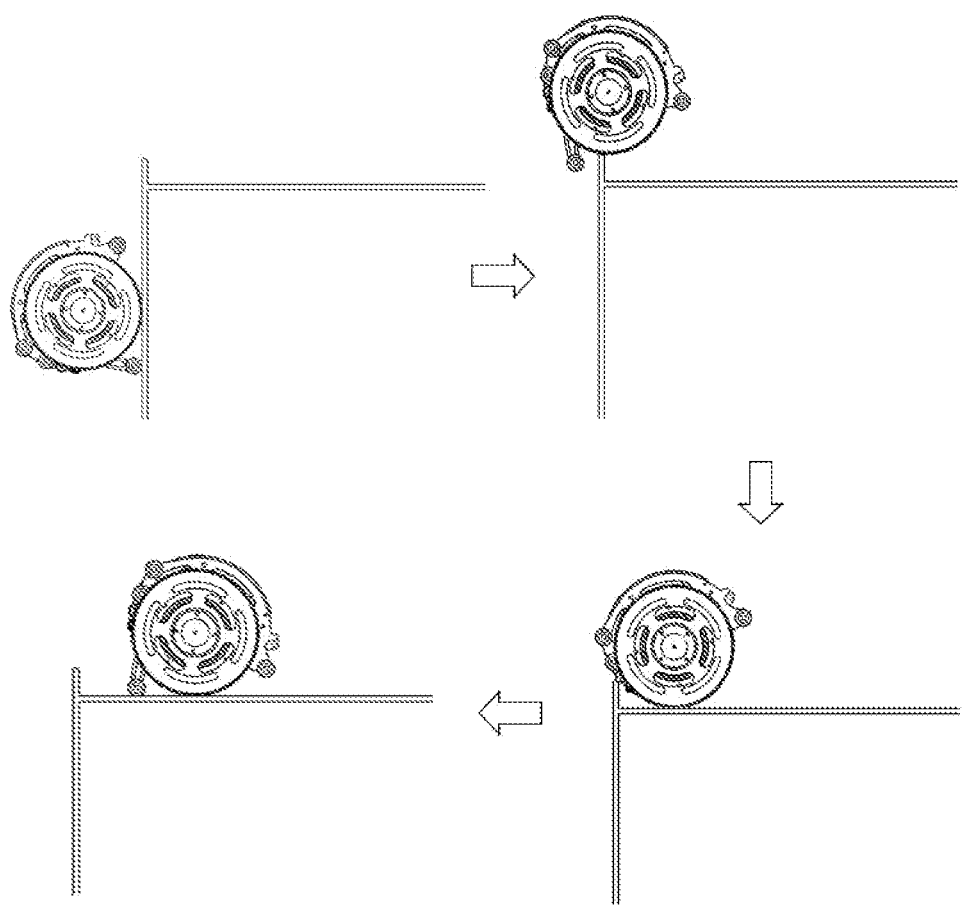
FIG. 24 is a schematic diagram in which a high-mobility wheeled climbing robot according to the present invention crosses a flanged edge from a vertical thin plate to a horizontal thin plate.

The flanged edge structure can be regarded as a structure formed by combining the internal corner with the thin plate, and a step of crossing the flanged edge structure is as follows. When the robot transits from one side of the thin plate to one side of the internal corner, equivalently the robot needs to first cross the edge of the thin plate and then transit the internal corner. The step of crossing the edge of the thin plate and the step of transiting the internal corner are the same as above. In a strategy used, the tail wheel module 3 is first controlled to be unfolded to make the robot cross the edge of the thin plate, then the tail wheel module 3 is controlled to be stored inside the base 1, and the robot transits the internal corner by using the transition roller wheels 4 of the internal corner transition assistance mechanisms, so as to cross the flanged edge, as shown in FIG. 23, where arrows represent a motion direction of the robot. When the robot transits from one side of the internal corner to one side of the thin plate, equivalently the robot needs to first transit the internal corner and then cross the edge of the thin plate. The step of transiting the internal corner and the step of crossing the edge of the thin plate are the same as above. In a strategy used, the tail wheel module 3 is first controlled to be stored to make the robot transit the internal corner by using the transition roller wheels 4 of the internal corner transition assistance mechanisms, then the tail wheel module 3 is controlled to be unfolded, and the robot crosses the edge of the thin plate by using the tail wheel module 3 as the support wheel, so as to cross the flanged edge, as shown in FIG. 24, where arrows represent a motion direction of the robot.

In summary, the robot according to the present invention has the capability of creeping on the flat surfaces with any angles, can transit the internal corner, the external corner, the edge of the thin plate, the flanged edge, and the complex structure with a combination of any two or more of characteristics of the internal corner, the external corner, the edge of the thin plate and the flanged edge, and can flexibly and reliably climb in the environment with the complex stereoscopic structure to reach a wider range of work sites to perform work tasks.

In specific content of the above specific embodiment, the technical features may be combined arbitrarily without contradiction. For the sake of brevity, all possible combinations of the above technical features are not described. However, the combinations of these technical features should all be considered to be within the scope of this specification as long as there is no contradiction between them.

Apparently, the above embodiment of the present invention is only an example to clearly illustrate the present invention, rather than limiting the implementation of the present invention. Those of ordinary skill in the art may also make other changes or variations in different forms on the basis of the above description. It is unnecessary and impossible to enumerate all embodiments herein. Any modifications, equivalent substitutions, improvements, etc. made within the spirit and principle of the present invention should be included within the scope of protection of the claims of the present invention.

What is claimed is:

1. A high-mobility wheeled climbing robot, comprising a base, magnetic wheel modules rotatably mounted on left and right sides of the base, a tail wheel module movably mounted on a rear side of the base and capable of moving to an inner side of the base relative to the base, internal corner transition assistance mechanisms mounted on the rear side of the base, and auxiliary moving wheels rotatably mounted on a front side of the base, wherein each of the magnetic wheel modules comprises a driving motor and a magnetic wheel connected to an output shaft of the driving motor; each of the internal corner transition assistance mechanisms comprises a plurality of transition roller wheels rotatably mounted on the base in sequence, and a distance between a center of each of the plurality of transition roller wheels and a center of the magnetic wheel is gradually increased in a direction from the tail wheel module to the auxiliary moving wheels; and a sensor module is arranged on a front side of the base, a controller module and a battery module are arranged in the base, the battery module and the sensor module are connected to the controller module, and the controller module is connected to the driving motor.

2. The high-mobility wheeled climbing robot according to claim 1, wherein when a first transition roller wheel is in contact with a first flat surface, an angle $\theta_1$ between a connecting line from the center of the magnetic wheel to a tangent point of the magnetic wheel and the first flat surface and a connecting line from the center of the transition roller wheel to the center of the magnetic wheel meets following condition:

$$\theta_1 > \arcsin\frac{Fd_1}{\tau}$$

wherein F is an adsorption force between the magnetic wheel on one side and the first flat surface, r is a maximum driving torque of the driving motor corresponding to the magnetic wheel on one side, and $d_1$ is a distance between the center of the magnetic wheel and the center of the transition roller wheel.

3. The high-mobility wheeled climbing robot according to claim 1, wherein the centers (x, y) of the plurality of transition roller wheels is distributed on a circumference of a first circle and meets following equation:

$$(x-R_1)^2+(y-R_1-d_2)^2=R_2^2$$

wherein $R_1$ is a radius of the magnetic wheel, $d_2$ is a distance between a center of the first circle and the center of the magnetic wheel, $R_2$ is a radius of the first circle, $R_2 > R_1 - d_2 - r_1$, and $r_1$ is a radius of the transition roller wheel.

4. The high-mobility wheeled climbing robot according to claim 1, wherein when the first transition roller wheel is in contact with the first flat surface, the magnetic wheel is internally tangent to the first flat surface and a second flat surface, the first flat surface is connected to the second flat surface, and an angle $\theta_2$ between a connecting line from the center of the magnetic wheel to a tangent point of the magnetic wheel and the second flat surface and a connecting line from a center of the auxiliary moving wheels to the center of the magnetic wheel meets following condition:

$$\theta_2 > \arccos\left(\frac{R_1 - r_2}{R_3}\right)$$

wherein $R_1$ is a radius of the magnetic wheel, $r_2$ is a radius of the auxiliary moving wheel, $R_3$ is a force arm of the auxiliary moving wheel, namely, a distance between the center of the auxiliary moving wheel and the center of the magnetic wheel, and $R_3 > R_1 - r_2$.

5. The high-mobility wheeled climbing robot according to claim 1, wherein the magnetic wheel comprises a wheel hub, a magnetic ring, and a rubber ring; the wheel hub is connected to the output shaft of the driving motor; the magnetic ring is fixedly mounted on the wheel hub; and the rubber ring is connected to a periphery of the wheel hub and an outer diameter of the rubber ring is greater than an outer diameter of the magnetic ring and an outer diameter of the wheel hub.

6. The high-mobility wheeled climbing robot according to claim 5, wherein the magnetic ring is of an axial magnetization ring magnetic structure or a Halbach permanent magnet array that is annularly distributed.

7. The high-mobility wheeled climbing robot according to claim 1, wherein the tail wheel module comprises a tail wheel motor, a tail wheel swing rod, and a tail roller wheel; the tail roller wheel is rotatably mounted on the tail wheel swing rod; the tail wheel swing rod is connected to an output shaft of the tail wheel motor; the tail wheel motor is mounted in the base; and the base is provided with an opening for the tail roller wheel and the tail wheel swing rod to rotate into.

8. The high-mobility wheeled climbing robot according to claim 7, wherein a distance $R_4$ between the tail roller wheel and a rotation center of the tail roller wheel meets following condition:

$$R_1 - d_3 - r_3 < R_4 < R_1 - r_3$$

wherein the rotation center of the tail roller wheel is located directly under the center of the magnetic wheel, $R_1$ is a radius of the magnetic wheel, $d_3$ is a distance between the rotation center of the tail roller wheel and the center of the magnetic wheel, and $r_3$ is a radius of the tail roller wheel.

9. The high-mobility wheeled climbing robot according to claim 1, wherein the base is cylindrical and comprises a base body and a cover body detachably connected to each other; and a cavity capable of accommodating the controller module, the battery module, and the sensor module is formed between the base body and the cover body.

10. The high-mobility wheeled climbing robot according to claim 9, wherein the internal corner transition assistance mechanisms has two and the two internal corner transition assistance mechanisms rotatably connected to a left side and a right side of the base body, respectively; the auxiliary moving wheels has two and the two auxiliary moving wheels rotatably connected to the left side and the right side of the base body, respectively; the tail wheel module has one and the tail wheel module located between the two internal corner transition assistance mechanisms and capable of being completely stored inside the base.

11. The high-mobility wheeled climbing robot according to claim 2, wherein the base is cylindrical and comprises a base body and a cover body detachably connected to each other; and a cavity capable of accommodating the controller module, the battery module, and the sensor module is formed between the base body and the cover body.

12. The high-mobility wheeled climbing robot according to claim 3, wherein the base is cylindrical and comprises a base body and a cover body detachably connected to each other; and a cavity capable of accommodating the controller module, the battery module, and the sensor module is formed between the base body and the cover body.

13. The high-mobility wheeled climbing robot according to claim 4, wherein the base is cylindrical and comprises a base body and a cover body detachably connected to each other; and a cavity capable of accommodating the controller module, the battery module, and the sensor module is formed between the base body and the cover body.

14. The high-mobility wheeled climbing robot according to claim 5, wherein the base is cylindrical and comprises a base body and a cover body detachably connected to each other; and a cavity capable of accommodating the controller module, the battery module, and the sensor module is formed between the base body and the cover body.

15. The high-mobility wheeled climbing robot according to claim 6, wherein the base is cylindrical and comprises a base body and a cover body detachably connected to each other; and a cavity capable of accommodating the controller module, the battery module, and the sensor module is formed between the base body and the cover body.

16. The high-mobility wheeled climbing robot according to claim 7, wherein the base is cylindrical and comprises a base body and a cover body detachably connected to each other; and a cavity capable of accommodating the controller module, the battery module, and the sensor module is formed between the base body and the cover body.

17. The high-mobility wheeled climbing robot according to claim 8, wherein the base is cylindrical and comprises a base body and a cover body detachably connected to each other; and a cavity capable of accommodating the controller module, the battery module, and the sensor module is formed between the base body and the cover body.

* * * * *